Figure 1:
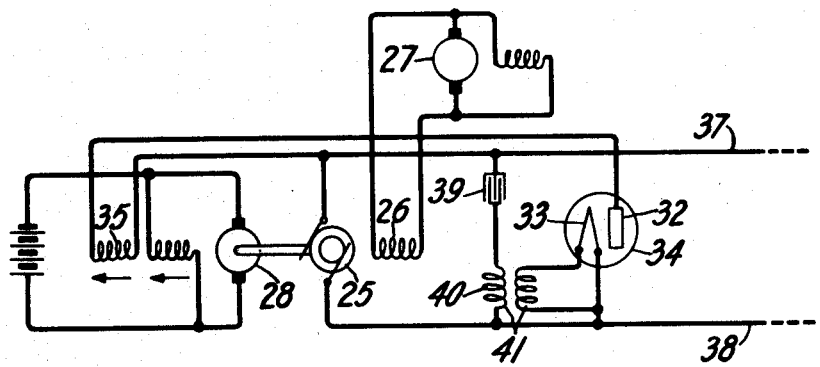

June 10, 1930.     H. M. STOLLER     1,763,016

ELECTRIC REGULATOR

Original Filed July 24, 1919

Inventor:
Hugh M. Stoller:
by E. W. Adam Att'y.

Patented June 10, 1930

1,763,016

UNITED STATES PATENT OFFICE

HUGH M. STOLLER, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK

ELECTRIC REGULATOR

Original application filed July 24, 1919, Serial No. 313,039. Divided and this application filed August 20, 1925. Serial No. 51,313. Renewed December 27, 1929.

This invention relates to a novel type of regulator which is applicable in general for the regulation of electric circuits, and is particularly adapted for controlling the frequency of an alternating current generator.

This application is a division of my previous application, Serial No. 313,039, filed July 24, 1919.

The regulator provided according to the present invention is of the thermionic type and comprises a vacuum tube containing electrodes. As is well known in the art, the cathode of a vacuum tube serves as a source of electrons that travel to the anode or plate electrode and the amount of this electron stream or space current depends upon several factors, primarily upon the temperature of the cathode, an increase in temperature producing a larger space current. It is also well known that changes in the temperature of a cathode create much more than proportional changes in the space current and consequently in the internal impedance of the tube, so that a vacuum tube may be made to respond very readily to changes in the temperature of the cathode.

In accordance with this invention, the frequency of the voltage generated by an alternating current generator is regulated by employing a thermionic regulator to control the driving source of the generator. If the generator is driven by a motor, the regulator may be inserted in circuit with an exciting winding of the motor, and the cathode of the tube may be supplied with current which varies as the frequency of the generated current. One way in which the heating current may be made to respond to the frequency, is to supply the cathode with said current through a circuit tuned to a frequency preferably higher than the maximum frequency desired from said machine. The intensity of the current in this tuned circuit will depend upon the frequency of the current so that the temperature of the cathode and consequently the effective impedance of the tube will respond to variations of the frequency generated, and will regulate the speed of the driving motor so as to bring about the desired regulation.

As is well known in the art, the space current of a vacuum tube at first increases very rapidly with increase in plate voltage, but after a certain value of the plate voltage, depending upon the temperature of the cathode, is reached, the space current remains substantially constant regardless of further increase in plate voltage. In utilizing a vacuum tube as a regulator, it has been found preferable to have the tube operate on that part of the curve above described where a wide variation in plate voltage will not produce any appreciable change in the space current.

The electric regulator of the thermionic type possesses many advantages over regulators of other types in that it is simple, efficient, light in weight and has no moving parts. Other advantages will be apparent from the detailed description of this invention.

For a better understanding of this invention, reference is made to the following detailed description in connection with the accompanying drawing in which Fig. 1 illustrates a thermionic regulator of this invention adapted to regulate the frequency of the current generated by an A. C. machine, and Fig. 2 is a curve showing how the current in the tuned circuit changes with the impressed frequency.

Referring to Fig. 1, 25 is an alternating current generator having a winding 26, which is supplied with current from an exciter 27. The generator 25 is driven by a motor 28. The anode 32 and cathode 33 of the vacuum tube 34 are connected in circuit with an exciting aiding winding 35 of the motor 28, across the leads 37 and 38. Connected across the brushes of the A. C. machine 25 are a condenser 39 and a winding 40 of a transformer 41. The secondary of transformer 41 is connected to the terminals of cathode 33. The capacity of condenser 39 and the inductance of winding 40 are preferably of such values as to form a circuit tuned to a frequency higher than the maximum frequency generated by the machine 25. The heating current for cathode 33, therefore, depends upon the strength of the alternating current flowing through condenser 39 and winding 40.

As is well known in the art, the strength of the current in a circuit containing inductance and capacity, is a maximum for the frequency of current to which the circuit is tuned and decreases rapidly in value as the frequency changes to other values.

Figure 2:
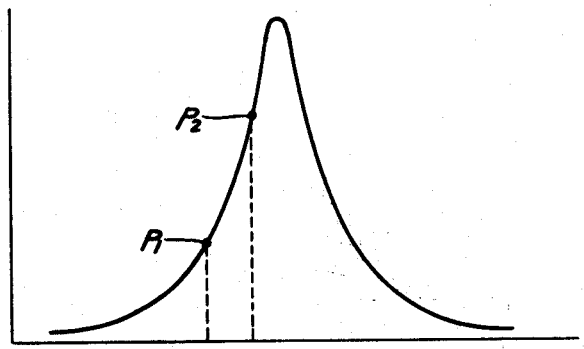

Fig. 2 illustrates a characteristic curve such as the tuned circuit containing condenser 39 and winding 40 may have. The ordinates represent various values of current while the abscissæ represent the various values of the impressed frequency. As stated above, it is preferable that the condenser 39 and inductance 40 be tuned to a higher value of frequency than will be met in the operation of generator 25 so that the variation in frequency, due to changes in load, for example, would be within the range of $P_1$ and $P_2$ on this curve. As may be seen from the drawing, the curve is very steep between these two points a small increase in frequency of the generator producing a very large increase in the value of the current flowing through the tuned circuit.

The manner in which the regulation is obtained in Fig. 1 may now be described as follows:

With the condenser 39 and inductance 40 so adjusted that the frequency of the current of generator 25 has a value intermediate the points $P_1$ and $P_2$ on the characteristic curve of the circuit, suppose that the frequency of the current generated by generator 25 should suddenly increase. This increase of frequency, as shown by the above mentioned characteristic curve, would produce a much greater change in the current flowing through inductance 40. This increase in current would be impressed through thansformer 41 on the cathode 33, increasing its temperature and increasing the current in the aiding winding 35 of motor 28. This change in the current through aiding winding 35 would slow down the speed of the generator 25 so as to restrict to a very small value the increase in frequency. It follows therefore, that any change in the frequency generated by generator 25 will so change the current through the aiding winding 35 of the motor 28, that the change in frequency would be restricted to a small value, thereby enabling the frequency of generator 25 to be maintained at a substantially constant value in spite of changes in the circuit conditions of the generator.

It is obvious that this invention is not limited to the particular form above described but may be considerably modified without departing in any wise from the essential novel principles inherent in this invention as defined in the appended claims.

What is claimed is:

1. In combination, an alternating current generator, and means for regulating the frequency of the current generated thereby, said means comprising an electric discharge device having a plurality of electrodes, connections from said generator for supplying space current between two of said electrodes, a path comprising inductance and capacity tuned to a frequency differing from the normal frequency of said generator, means for controlling through the intermediary of said path a characteristic of one electrode of said device in response to variations in the frequency of the current generated, and means controlled by the resulting variations in the space current of said device for controlling said generator.

2. In combination, an alternating current generator, a motor for driving said generator, a field winding for said motor, and means for regulating the frequency of the current produced by said generator, said means comprising an electric discharge device having a plurality of electrodes, connections from said generator for supplying space current between two of said electrodes, a path comprising inductance and capacity tuned to a frequency differing from the normal frequency of said generator connected across the generator terminals independently of the motor circuit, means for controlling through the intermediary of said path the temperature of an electrode of said device in response to variations in the characteristic of said generator, and connections for supplying the space current of said device to said field winding for controlling said generator.

3. In combination, an alternating current generator, and means for regulating the frequency of the current generated thereby, said means comprising an electric discharge device having a cathode and an anode, connections from said generator for supplying space current between two electrodes, a path comprising inductance and capacity tuned to a frequency differing from the normal frequency of said generator, a second inductance inductively coupled to said first inductance and connected to said cathode for supplying heating current thereto, the value of which varies in accordance with the frequency of the current generated, and means controlled by the resulting variations in the space current of said device for controlling said generator.

4. In combination, an alternating current generator, a motor for driving said generator, said motor having an exciting winding, and means for regulating the frequency of the current generated, said means comprising an electric discharge device having an anode and a thermionic cathode, connections from one electrode of said device to one terminal of said generator, and connections from the other electrode of said device through said exciting winding to the other terminal of said generator for supplying exciting current to said winding, a path comprising inductance and capacity tuned to a frequency differing from the normal frequency of said generator connected to the terminals of said generator, and means for supplying heating current to said cathode through the intermediary of said path.

5. In a regulator system, an alternating current generator, an electron discharge device having a cathode and an anode connected across the terminals of said generator, means comprising a tuned circuit connected to the output circuit of said generator for heating said cathode in accordance with the frequency of said generator, and means for controlling the frequency of the generator in accordance with the space current of said device.

6. In a regulator system, a motor having a regulating field winding, a source of alternating current having a frequency varying according to the motor speed, a space discharge device having the anode and cathode thereof connected to said source of alternating current for receiving space current therefrom, and means for controlling said device according to the frequency of said source to govern said field winding so as to maintain the motor speed constant.

7. In a regulator system, a motor, a source of alternating current having a frequency varying according to the motor speed, a space discharge device having the anode and cathode thereof connected to said source for receiving space current therefrom, means comprising a tuned circuit for controlling said device according to the frequency of said source, and means governed by said device for maintaining the motor speed constant.

8. In a regulator system, a dynamo-electric machine, a source of alternating current having a frequency varying according to a characteristic of said machine, a space discharge device having the anode and cathode thereof connected to said source for receiving space current therefrom, means for controlling said device according to the frequency of said source, and means governed by said device for maintaining said characteristic of the machine constant.

9. In a regulator system, a dynamo-electric machine, a source of alternating current having a frequency varying according to a characteristic of said machine, a space discharge device having the anode and cathode thereof connected to said source for receiving space current therefrom, means comprising a tuned circuit for controlling said device according to the frequency of said source, and means governed by said device for maintaining said characteristic of the machine constant.

10. In a regulator system, a dynamo-electric machine, a source of alternating current having a frequency varying according to a characteristic of said machine, a space discharge device having alternating current connected to the anode and cathode thereof, means for controlling said device according to the frequency of said source, and means governed by said device for maintaining the characteristic of said machine constant.

11. In a regulator system, a motor, a source of alternating current having a frequency varying according to the speed of the motor, a space discharge device having alternating current connected to the anode and cathode thereof, means for controlling said device according to the frequency of said source, and means governed by said device for maintaining the motor speed constant.

In witness whereof I hereunto subscribe my name this 17th day of August, A. D. 1925.

HUGH M. STOLLER.